United States Patent Office 3,600,358
Patented Aug. 17, 1971

3,600,358
POLYURETHANE-UREA ELASTOMERS PREPARED FROM 4,4'-METHYLENE BIS (CYCLOHEXYL-ISOCYANATE), NEOPENTYL ADIPATE AND AN AROMATIC DIAMINE
Bernard Taub, Williamsville, N.Y., assignor to Allied Chemical Corporation, New York, N.Y.
No Drawing. Filed Jan. 28, 1969, Ser. No. 794,770
Int. Cl. C08g 22/10
U.S. Cl. 260—75NH
10 Claims

ABSTRACT OF THE DISCLOSURE

Polyurethane elastomers having improved hydrolytic stability are prepared from 4,4'-methylene bis(cyclohexylisocyanate), neopentyl adipate polyester and an aromatic diamine.

POLYURETHANE–UREA ELASTOMERIC COMPOSITIONS

This invention relates to polyurethane elastomers, having improved hydrolytic stability, which are prepared from 4,4'-methylene bis(cyclohexylisocyanate); neopenyl adipate polyester; and an aromatic diamine.

It is known that polyurethane compositions can be prepared by chain-extending isocyanate-terminated prepolymers with a curing agent containing active hydrogen groups, such as a diamine, polyol, water and the like. The prepolymers are commonly prepared by condensation of a polyester or polyether with an excess of an aromatic diisocyanate. Where high performance elastomers are desired the preferred curing agents are aromatic diamines. However, the use of aromatic diamines presents a processing problem with many prepolymers. For example, when an isocyanate-terminated prepolymer is reacted with a highly reactive aromatic diamine such as methylene dianiline, the reaction is so rapid that there is not ample time to run the mixture into a suitable mold before the composition begins to gel. In most instances, the mixture of the prepolymer and diamine chain-extender remain in a fluid, pourable condition for a relatively short time, that is, such compositions gel in a relatively short time, generally measurable in seconds. This necessitates the preparation of such mixtures in small batches which is inconvenient and expensive since it is time consuming and is not conducive to large scale manufacture. Various procedures have been suggested to overcome the problem, but with little success.

The problem of rapid reactivity has therefore discouraged the use of many aromatic diamines. An exception is found in the case of certain halogenated aromatic diamines such as methylene bis(o-chloroaniline) and 3,3'-dichlorobenzidine. In such compounds the presence of chlorine groups ortho to the amine group tends to slow down the curing reaction sufficiently to make the process workable.

There are, however, several disadvantages to the use of the chlorine-containing diamines. They often slow down the curing reaction to such an extent that the reaction becomes unreasonably slow for some purposes necessitating the use of catalysts to accelerate the reaction to a practical rate. Moreover, such chlorine-containing diamines are relatively expensive compared to other diamines such as methylene dianiline and result in elastomers having poor hydrolytic stability.

In my co-pending United States application Ser. No. 794,763, entitled Polyurethane Elastomers Cured With Methylene Dianiline, filed of even date herewith, it is disclosed that prepolymers prepared from 4,4'-methylene bis(cyclohexylisocyanate) and a polyol can be chain-extended with methylene dianiline to yield a polyurethane-urea elastomer having an improved curing time and having improved hydrolytic stability. It has now been found that in even greater improvement in hydrolytic stability is achieved in compositions prepared from 4,4'-methylene bis(cyclohexylisocyanate) when the polyol consists essentially of polyneopentyl adipate and that the resulting prepolymer may be chain-extended with not only methylene dianiline but other aromatic diamines as well and still achieve the improvements discussed above.

Thus, in accordance with the present invention there is provided a polyurethane-urea elastomer having improved curing time and hydrolytic stability, comprising the reaction product of (1) an isocyanate-terminated prepolymer derived from 4,4'-methylene bis(cyclohexylisocyanate) and a polyneopentyl adipate having a molecular weight of between about 500 and 3000, preferably between about 1000 and 2200 and (2) a chain-extending agent which is an aromatic diamine of the general formula:

(I) 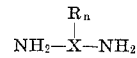

wherein
X is an arylene or arylenealkyl radical devoid of halogen substituents, preferably, a phenylene, biphenylene or diphenylenemethane radical and especially preferred are those diamines having the structure of Formula I when X is a diphenyl methane radical.
R is hydrogen, alkyl of 1 to 4 carbon atoms or alkoxy of 1 to 4 carbon atoms and $n$ is an integer of 1 to 4.

Typical aromatic diamines falling within the scope of Formula I which may be employed as curing agents in the present invention include, for example, 4,4'-methylenedianiline (hereinafter referred to as methylene dianiline)
metaphenylenediamine
2,4-toluene diamine
3,3'-dimethyl-4,4'-diphenylmethane diamine
3,3'-dibutyl-4,4'-diphenylmethane diamine
3,3'-diethyl-4,4'-biphenyl diamine
3,3'-dimethyl-4,4'-biphenyl diamine
3,3'-dimethoxy-4,4'-biphenyl diamine
butoxy-2,4-phenylenediamine
p-xylylene diamine
2,4-diaminoanisole
ethoxy-2,4-phenylenediamine
naphthylene diamines and the like.

An especially preferred diamine curing agent, based on economic consideration as well as superiority of properties imparted to the final product is methylene dianiline.

Polyneopentyl adipate is a polyester prepared by reaction of neopentyl glycol and adipic acid. Polyneopentyl adipate polyesters, suitable for use in the present invention have a molecular weight in the range of about 500 to 3000 and an acid number below about 20.0, and preferably below about 1.0. Inasmuch as the polyesters are intended to be used as reactants with an organic diisocyanate, it will be obvious that they are of the hydroxy terminated class and hence in their preparation an excess of the glycol should be employed. In a typical preparation of a suitable polyneopentyl adipate, about 29 mols of neopentyl glycol is mixed with about 21 mols of adipic acid and the reaction mixture is maintained at about 230 to 240 degrees centigrade until the acid number of the mixture is below about 1.0. The remaining excess of neopentyl glycol is removed by distillation to yield a polyneopentyl adipate having an OH number of about 64. Especially preferred for use in the present invention are polyneopentyl adipates having a molecular weight in the range of about 1000 to 2200.

4,4'-methylene bis(cyclohexylisocyanate) exists in 3 different isomeric forms depending on the position, i.e. cis or trans of the isocyanate group with respect to the methylene bridging group. The usual commercial grades of this isocyanate are mixtures of various proportions of the 3 isomers, i.e. cis-cis, cis-trans, and trans-trans isomers. The isomers can be separated by conventional physical separation methods. Either the pure isomers or mixtures thereof are suitable for use in the present invention. Mixtures containing from about 25 percent to about 52 percent of the trans-trans isomer are preferred herein.

The prepolymer compositions of the present invention are prepared in a conventional manner. In a preferred mode of preparation, the polyneopentyl adipate is reacted with 4,4'-methylene bis(cyclohexylisocyanate) in proportions suitable to yield a prepolymer having an NCO/OH ratio of greater than 1 and preferably between about 1.5 and 3.0. The mixture is heated at about 120 to 140° C. for a period of about 1 to 4 hours. The aromatic diamine chain extending agent is added, preferably at a temperature above its melting point, preferably in an amount of within about 20 percent of the stoichiometric amount required to react with all the available NCO groups and preferably within the range of more than 35 percent and less than 100 percent of the stoichiometric amount. The mixture is agitated and heated, preferably at a temperature of between about 65 and 135 degrees centigrade since at these temperatures the optimum gel time is achieved. The gel time is the period after which the reaction mixture is no longer pourable at reaction temperature. The mixture is then applied to the mold or substrate and cured at a temperature of about 65 to 135 degrees centigrade. Usually, a molded elastomer can be removed from the mold after about ½ to 1 hour. The elastomer may then be post-cured in a conventional manner, for example, by maintaining it at a temperature of 100 degrees centigrade for 15 to 20 hours.

It will be apparent to those skilled in the art that the preparation and curing conditions may vary considerably from those stated above. The foregoing description is intended only to illustrate a preferred mode of operation and is not to be construed as limitative.

To further illustrate the present invention and the manner in which it may be practiced, the following specific examples are set forth. In the examples, unless otherwise indicated all parts and percentages are by weight and all temperatures are in centigrade degrees.

EXAMPLE I 790 parts of a polyneopentyl adipate (M.W.=2200) was mixed and reacted with 405 parts of 4,4'-methylene bis(cyclohexylisocyanate) (52 percent trans-trans isomer) at about 120 degrees for 2 hours then cooled to room temperature to yield an isocyanate terminated prepolymer having an amine equivalent of 773, i.e. an NCO content of 6.25%. One hundred parts of the prepolymer was heated and mixed at 100 degrees with 12.7 parts of methylene dianiline (sufficient to react with 99 percent of the available NCO groups). The heated mixture was poured into a mold which had been preheated to 100 degrees, removed after 30 minutes and post cured at 100° C. for 18 hours. After a ten day aging period, sample strips were cut from the cured elastomer and tested for tensile strength following the test procedure described in ASTM–D412–51T. The samples were then placed in a water bath maintained at 98 degrees. Samples were removed from the bath periodically, dried at 100 degrees for one hour, conditioned for 5 days at room temperature and then retested for tensile strength.

For purposes of comparison, additional elastomers were similarly prepared and tested except that the composition was varied with respect to the isocyanate, polyester, and/or curing agent employed. The compositions and tensile strength measurements are shown in Table I below.

TABLE I

|  | Ex. 1 | Comparative example | | | |
|---|---|---|---|---|---|
|  |  | 2 | 3 | 4 | 5 |
| Elastomer composition (parts by weight): neopentyl adipate (M.W.=2,200) | 250 | | | | |
| Ethylene propylene adipate (AP-102, Rohm & Haas Co., M.W.=2,000) | | 790 | 1,000 | 1,000 | |
| Polycaprolactone polyester (NIAX–D560, Union Carbide Co., M.W.=2,000) | | | | | 500 |
| 4,4'-methylenebis(phenylisocyanate) | | 300 | | | |
| 4,4'-methylenebis(cyclohexylisocyanate) | 97 | | 405 | 405 | 202 |
| Curing agent (parts/100 parts of prepolymer): methylenebis(o-chloroaniline) | | 18.5 | 18.4 | | |
| Methylene dianiline | 12.7 | | | 13.5 | 12.3 |
| Amine equivalent | 773 | 719 | 728 | 728 | 796 |
| NCO content, percent | 5.40 | 5.85 | 5.77 | 5.77 | 5.30 |
| Tensile strength (p.s.i.): |  |  |  |  |  |
| Initial | 4,920 | 5,130 | 4,870 | 5,460 | 6,440 |
| After 1 day (in 98° C. H₂O) | 4,950 | 4,070 | 4,590 | 5,470 | 5,760 |
| After 2 days (in 98° C. H₂O) | 4,740 | 1,900 | 3,930 | 5,160 | 5,220 |
| After 3 days (in 98° C. H₂O) | 4,770 | 720 | 2,700 | 4,120 | 4,840 |
| After 7 days (in 98° C. H₂O) | 2,050 | 140 | | 700 | 1,000 |

The retention of tensile strength of the above samples after immersion in 95° C. water for various time intervals as shown in Table I, is shown below in terms of percent of initial tensile strength retained.

|  | Ex. 1 | Comparative example | | | |
|---|---|---|---|---|---|
|  |  | 2 | 3 | 4 | 5 |
| Initial tensile strength (p.s.i.) | 4,920 | 5,130 | 4,870 | 5,460 | 6,440 |
| Percent retention of tensile strength: | | | | | |
| After 1 day | 100 | 79 | 94 | 100 | 90 |
| After 2 days | 93 | 37 | 80 | 95 | 81 |
| After 3 days | 93 | 14 | 55 | 75 | 75 |
| After 7 days | 42 | 0 | 0 | 13 | 15 |

EXAMPLES 6–11

The procedure of Examples 1–5 was repeated using various polyesters which were reacted with methylenebis(4-cyclohexylisocyanate) (52 percent trans-trans isomer) in an NCO/OH ratio of 2.0 and the resultant prepolymers cured by reaction with methylene dianiline.

The cured elastomers were tested for hydrolytic stability following the procedure described in Examples 1–5. The compositions and test results are summarized in Table II below.

In Examples 12–15 the importance of the selection of curing agent is shown. Superior hydrolytic stability is found in the elastomers of Examples 12, 14 and 15, wherein the curing agent is in accordance with the present in-

TABLE II

|  | Ex. 6 | Comparative example | | | | |
|---|---|---|---|---|---|---|
|  |  | 7 | 8 | 9 | 10 | 11 |
| Composition (parts by wt.): |  |  |  |  |  |  |
| 4,4'-methylenebis (cyclohexylisocyanate) | 524 | 524 | 445 | 524 | 524 | 524 |
| Neopentyl adipate (M.W.=850) | 850 |  |  |  |  |  |
| Polyester S-1010-110 [1] |  | 952 |  |  |  |  |
| Polyester S-101-100 [1] |  |  | 964 |  |  |  |
| Polyester S-102-110 [1] |  |  |  | 1,052 |  |  |
| Polyester S-105-115 [1] |  |  |  |  | 924 |  |
| Polycaprolactone polyester (NIAX–D520, Union Carbide Co., M.W.=824) |  |  |  |  |  | 824 |
| Methylene dianiline (parts/100 parts of prepolymer) | 13.0 | 14.0 | 11.6 | 11.1 | 12.2 | 14.4 |
| Amine equivalent | 753 | 701 | 846 | 878 | 803 | 681 |
| NCO content (percent) | 5.6 | 5.9 | 5.0 | 4.8 | 5.2 | 6.17 |
| Tensile strength after immersion in 95° C. water (p.s.i.): |  |  |  |  |  |  |
| Initial | 5,790 | 4,160 | 6,050 | 6,250 | 6,470 | 6,400 |
| After 1 day |  | 4,370 | 5,850 | 5,710 | 5,690 |  |
| After 2 days | 5,560 | 4,520 | 2,770 | 4,580 | 4,410 | 4,270 |
| After 3 days | 5,540 | 2,760 | 1,220 | 3,840 | 3,850 | 3,850 |
| After 7 days | 3,030 | 1,220 | 350 | 690 | 1,030 | 1,290 |

[1] A series of linear hydroxyl-terminated polyesters sold by Ruco Division of Hooker Chemical Corporation. The suffix numbers indicate the hydroxyl number and thus, indirectly, the average molecular weight, according to the formula:

$$\text{Ave. M.W.} = \frac{2 \times 56,100/}{\text{OH number}}$$

The retention of tensile strength of the above samples after immersion in 95° C. water for the various time intervals is shown below in terms of percent retention of the initial tensile strength.

vention. By comparison, the substitution of a curing agent which is an aromatic diamine containing chlorine groups such as MOCA (Example 13) resulted in poor hydrolytic stability.

|  | Ex. 6 | Comparative example | | | | |
|---|---|---|---|---|---|---|
|  |  | 7 | 8 | 9 | 10 | 11 |
| Initial tensile strength (p.s.i.) | 5,790 | 4,160 | 6,050 | 6,250 | 6,470 | 6,400 |
| Percent retention of tensile strength after immersion in 95° C. water: |  |  |  |  |  |  |
| After 1 day |  |  | 72 | 94 | 88 | 89 |
| After 2 days | 96 | 100 | 46 | 73 | 68 | 67 |
| After 3 days | 96 | 66 | 20 | 61 | 60 | 60 |
| After 7 days | 52 | 29 | 6 | 11 | 16 | 20 |

From the foregoing examples it will be seen that the compositions of the present invention, possess the unusual property of retention of tensile strength on being immersed in hot water for extended periods, to a surprising degree.

EXAMPLES 12–15

An isocyanate-terminated prepolymer was prepared by heating a mixture of 1094 parts of neopentyl adipate (M.W.=1750) and 328 parts of 4,4'-methylenebis(cyclohexylisocyanate) at 120 degrees for three hours. The prepolymer had an NCO content of 3.6 percent. Portions of the prepolymer were cured by reaction at 100 degrees with various diamines in amounts sufficient to react with 99 percent of the available NCO groups.

The cured elastomers were molded and tested for hydrolytic stability as in Example 1, above except that water temperature was maintained at 70 degrees.

The tensile strength thus obtained were as follows:

I claim:
1. A polyurethane elastomer which is the product of the reaction of (1) an isocyanato-terminated prepolymer formed by reaction of an excess of 4,4-methylene bis-(cyclohexylisocyanate) and a polyneopentyl adipate having an average molecular weight of between about 500 and 3000 with (2) an aromatic diamine curing agent of the formula

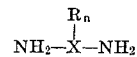

wherein

X is an arylene or arylenealkyl radical devoid of halogen substituents;
R is hydrogen, alkyl or 1 to 4 carbon atoms or alkoxy of 1 to 4 carbon atoms and
$n$ is an integer of 1 to 4.

|  | Comparative example | | | |
|---|---|---|---|---|
|  | Example 12 | 13 | 14 | 15 |
| Curing agent | Methylene dianiline. | Methylene-bis (o-chloroaniline). | m-Phenylene diamine. | 2,4-toluene diamine. |
| Tensile strength (p.s.i.): |  |  |  |  |
| Initial | 4,590 | 4,900 | 4,870 | 4,670. |
| After 1 week | 4,390 | 4,660 | 4,530 | 5,400. |
| After 4 weeks | 2,510 | 700 | 2,700 | 2,060. |
| After 6 weeks | 1,100 | Failed | 1,070 | 630. |
| After 7 weeks | 700 | 0 | 430 | 340. |

2. A polyurethane elastomer as claimed in claim 1 wherein said polyneopentyl adipate has an average molecular weight of between about 1000 and 2200.

3. A polyurethane elastomer as claimed in claim 1 wherein R is hydrogen and X is a diphenylene methane radical.

4. A polyurethane elastomer as claimed in claim 1 wherein R is an alkyl radical of 1 to 4 carbon atoms, $n$ is 1 and X is a phenylene radical.

5. A polyurethane elastomer as claimed in claim 1 wherein R is hydrogen and X is a phenylene radical.

6. A polyurethane elastomer as claimed in claim 3 wherein said aromatic diamine is methylene dianiline.

7. A polyurethane elastomer as claimed in claim 4 wherein said aromatic diamine is 2,4-toluene diamine.

8. A polyurethane elastomer as claimed in claim 5 wherein said aromatic diamine is m-phenylene diamine.

9. A polyurethane elastomer as claimed in claim 1 wherein said aromatic diamine is provided in an amount sufficient to react with more than 35 percent and less than 100 percent of the NCO groups of the prepolymer.

10. A polyurethane elastomer as claimed in claim 1 wherein the NCO/OH ratio of said prepolymer is between about 1.4 and 3.0 to 1.0.

References Cited

UNITED STATES PATENTS 3,428,610  2/1969  Klebert _____ 260—75

DONALD E. CZAJA, Primary Examiner

M. J. WELSH, Assistant Examiner

U.S. Cl. X.R.

260—75NT

UNITED STATES PATENT OFFICE
CERTIFICATE OF CORRECTION

Patent No. 3,600,358            Dated August 17, 1971

Inventor(s) Bernard Taub

It is certified that error appears in the above-identified patent and that said Letters Patent are hereby corrected as shown below:

Column 2, line 12, the word "in" should be -- an --.

Table II, Footnote No. 1, 2nd line, the word "ndicate" should be -- indicate --.

Table II, Footnote No. 1, that part of the formula reading "2X56,100/" should be -- 2X56,100 --

Claim 1, line 4, that part of the formula reading "4,4-methylene" should read -- 4,4'-methylene --.

Signed and sealed this 19th day of December 1972.

(SEAL)
Attest:

EDWARD M. FLETCHER, JR.            ROBERT GOTTSCHALK
Attesting Officer                 Commissioner of Patents